United States Patent [19]
Baur et al.

[11] Patent Number: 5,136,526
[45] Date of Patent: Aug. 4, 1992

[54] DETERMINATION OF THE THICKNESS OF A MAGNETIC TAPE

[76] Inventors: Reinhold Baur, 1 Eschbachstrasse, 7601 Ortenberg; Juergen Klausmann, 10a An der Tagmess, 7600 Offenburg, both of Fed. Rep. of Germany

[21] Appl. No.: 563,814

[22] Filed: Aug. 6, 1990

Related U.S. Application Data

[63] Continuation of Ser. No. 236,214, Aug. 25, 1988, abandoned.

[30] Foreign Application Priority Data

Sep. 3, 1987 [DE] Fed. Rep. of Germany ....... 3729407

[51] Int. Cl.$^5$ .................... G06F 15/20; B65H 61/00
[52] U.S. Cl. .................... 364/563; 242/75.51; 340/675; 364/562; 364/550; 364/469
[58] Field of Search ............... 364/562, 563, 550, 469, 364/551.01, 470, 471, 472, 560, 558; 360/16, 71, 137; 242/75.51, 75.52, 75.47, 67.5; 340/675

[56] References Cited

U.S. PATENT DOCUMENTS

| | | | |
|---|---|---|---|
| 3,145,294 | 8/1964 | Jackson | 364/562 |
| 4,052,599 | 10/1977 | Whiteley et al. | 364/562 |
| 4,151,403 | 4/1979 | Woolston | 364/562 |
| 4,280,159 | 7/1981 | Nakayama | 364/562 |
| 4,335,439 | 6/1982 | St. Denis | 364/562 |
| 4,411,008 | 10/1983 | d'Alayer de Costemore | 364/562 |
| 4,535,949 | 8/1985 | Olsson | 364/562 |
| 4,549,268 | 10/1985 | Stutz | 364/562 |
| 4,635,216 | 1/1987 | Stutz et al. | 364/562 |
| 4,755,888 | 7/1988 | Hori et al. | 360/16 |

FOREIGN PATENT DOCUMENTS

| | | | |
|---|---|---|---|
| 0118071 | 10/1978 | Japan | 364/562 |
| 1516403 | 7/1978 | United Kingdom | 364/563 |

*Primary Examiner*—Kevin J. Teska

[57] ABSTRACT

To check the thickness of a magnetic tape in relation to preset tolerance limits in the course of the winding of the tape onto a hub of a tape cassette, the tape thickness is determined by means of a microprocessor from the number of revolutions of the hub during the winding of the tape and the wound tape length.

3 Claims, 1 Drawing Sheet

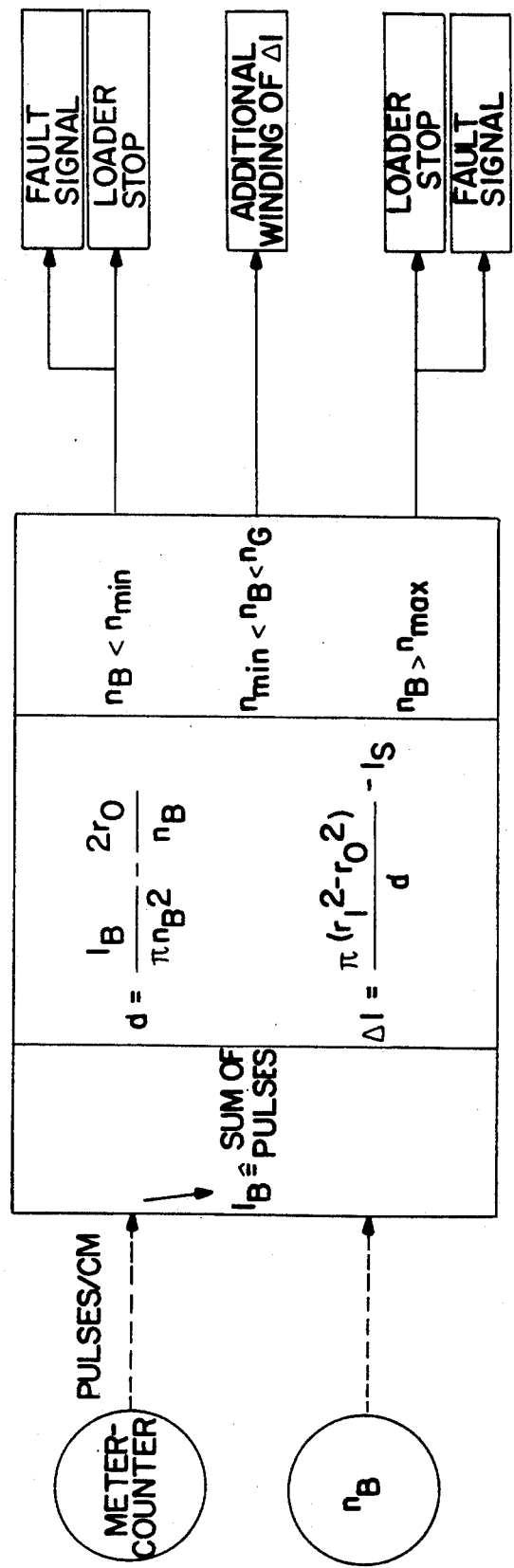

DETERMINATION OF THE THICKNESS OF A MAGNETIC TAPE

This application is a continuation of application Ser. No. 07/236,214, filed on Aug. 25, 1988, now abandoned.

The present invention relates to a method of measurement for determining the thickness of a magnetic tape wound in roll form.

In the manufacture of magnetic tape cassettes, for example audio or video cassettes, a predetermined length of magnetic tape is wound off a pancake, which contains enough tape for a large number of cassettes, and onto the hub of the cassette by means of a leader already attached thereto. This part of cassette manufacture, which is referred to as confectioning, is carried out on automatic loaders. In the course of loading it is necessary to monitor the thickness of the magnetic tape in order that breaches of the thickness tolerance limits may be detected.

For this reason the pancake has hitherto been measured in random spot checks, which has the disadvantage that for strict quality control the number of checks must be high on account of the large number of cassettes to be confectioned from one pancake. Since this is both labor and time-intensive it is not compatible with efficient cassette manufacture within short cycle times. Furthermore, accurate tape thickness measurement for every cassette would be an advantage, since it would then be possible in the case of very thin tape material at the lower tolerance limit to wind additional lengths of tape onto the hub of the cassette in order to guarantee a minimum roll diameter for video cassette recorders with automatic tape type recognition.

BRIEF DESCRIPTION OF THE DRAWING

The drawing represents a flow sheet illustrating the method of the present invention. This method is described in detail below.

It is an object of the present invention to develop a method of measurement whereby the thickness of a magnetic tape can be determined as it is being wound in roll form.

We have found that this object is achieved according to the invention in a method of measurement comprising the following steps:

counting the number of revolutions $n_B$ of the hub of radius or during the winding of the magnetic tape, measuring the length of wound tape $l_B$, and determining the tape thickness d using the mathematical relation:

$$d = \frac{l_B}{\pi n_B^2} - \frac{2r_0}{n_B}$$

In a refinement of the method of measurement of the invention, the average thickness $d_{ij}$ of a tape section is computed continuously during the winding onto the hub of radius $r_o$ by a microprocessor from the wound length $l_{ij}$ of the tape section and the correlated number of revolutions $n_{ij}$ of the hub using the mathematical relation:

$$d_{ij} = \frac{l_{ij}}{\pi n_{ij}^2} - \frac{2l_{oi}}{\pi n_{oi} n_{ij}} + \frac{2r_0}{n_{ij}}$$

where $l_{oi}$ and $n_{oi}$ are respectively the length of wound tape preceding the tape section and the correlated number of revolutions of the hub;

In an advantageous embodiment of the method of measurement, the tape thickness d is computed by a microprocessor from the measured data and, as a function of the result, the target length $l_s$ of the magnetic tape to be wound to obtain a minimum roll diameter $r_1$ is extended in accordance with the mathematical relation:

$$\Delta l = \frac{\pi(r_1^2 - r_0^2)}{d} - l_s$$

by an additional tape length $\Delta l$.

In what follows, the invention is illustrated by means of application examples.

In connection with magnetic tape cassettes to be confectioned on a loader, the thickness d of each tape wound onto the hub of a cassette is to be monitored during the confectioning process using the following method of measurement:

counting the number of revolutions $n_B$ of the hub of radius $r_o$ in the course of the winding of the magnetic tape, counting the number of pulses of a tape length measuring means to determine the wound tape length $l_B$, calibrating between the tape thickness measured directly by means of a thickness gauge and the tape thickness determined, after winding, from the roll diameter and the number of turns of tape on the hub, the latter tape thickness depending on the operating conditions of the loader and the physical properties of the tape, for example its surface roughness, and being referred to hereinafter as the effective tape thickness, computing the tape thickness d using the mathematical relation:

$$d = \frac{l_B}{\pi n_B^2} - \frac{2r_0}{n_B}$$

by a microprocessor.

By comparing the tape thickness determined in this way with predetermined tolerance limits it is possible to arrange for a monitoring procedure where on breaching of the limits a signal is generated as an alarm and/or to switch off the loader.

In the case of video cassette recorders with automatic recognition of tape type, misrecognition may be possible with tapes whose thickness is at the lower tolerance limit, since tape type is determined via the roll area. The minimum roll diameter $r_1$ necessary for correct recognition can be obtained by winding additional tape as a function of the average tape thickness. To determine this additional tape length 61 by which the target length $l_s$ of the wound magnetic tape is to be extended, first the tape thickness d is determined as described above. The tape length $\Delta l$ is then obtained using the mathematical relation:

$$\Delta l = \frac{\pi(r_1^2 - r_0^2)}{d} - l_s$$

In the case of a predetermined length of tape to be wound onto a hub of a cassette, the tape thickness can be monitored in relation to the tolerance limits via the number of revolutions $n_B$ of the hub according to the following criteria:

$n_{min}$: minimum permissible number of revolutions
$n_B < n_{min} \rightarrow$: error message: tape too thick
$n_{max}$: maximum permissible number of revolutions
$n_B > n_{max} \rightarrow$: error message: tape too thin
$n_G$: number of revolutions for winding on an additional tape length $\Delta l$
$n_{min} < n_B < n_G \rightarrow \Delta l = (n_B - n_G) \cdot f$ The correction factor f arises from the operating conditions of the loader (tape tension, winding speed) and is determined empirically.

In a further refinement of the method of measurement of the invention, a continuous monitoring of the thickness of a tape being wound, for example for local irregularities, can be carried out by continuous computation of the average thickness $d_{ij}$ of a tape section during the winding onto the hub of radius $r_o$ by a microprocessor from the wound length $l_{ij}$ of the tape section and the correlated number of revolutions $n_{ij}$ of the hub using the mathematical relation:

$$d_{ij} = \frac{l_{ij}}{\pi n_{ij}^2} - \frac{2l_{oi}}{\pi n_{oi} \cdot n_{ij}} + \frac{2r_0}{n_{ij}}$$

where $l_{oi}$ and $n_{oi}$ are respectively the length of wound tape preceding the tape section and the correlated number of revolutions of the hub.

We claim:

1. A method of loading magnetic tape which has a length and thickness onto a cassette which has a hub, so as to ensure that the average thickness of the tape falls within desired upper and lower limits, which method comprises the steps of:
   (a) setting a desired minimum average tape thickness which is expressed as $d_{min}$ and a maximum average tape thickness $d_{max}$;
   (b) winding a magnetic tape from a magnetic tape source and loading it onto the hub of the cassette, which hub has a radius expressed as $r_o$;
   (c) counting the number of revolutions of the hub, which number of revolutions is expressed as $N_B$;
   (d) measuring the length of the tape wound onto the hub, which length is expressed as $l_B$;
   (e) determining the average thickness of the tape, expressed as d using the following equation $$d = \frac{l_B}{\pi (N_B)^2} - \frac{2r_0}{N_B};$$

(f) discontinuing the winding of the magnetic tape when d, the average thickness of the tape length $l_B$ is less than $d_{min}$ or more than $d_{max}$; and
   (g) continuing the winding of the magnetic tape when d, the average thickness of the tape length $l_B$ is within the limits $d_{min}$ and $d_{max}$.

2. A method of loading magnetic tape having a length and thickness onto a cassette which has a hub, comprising monitoring the fluctuation of the thickness of sections of the tape during the winding process in order that breaches of the thickness tolerance limits may be undetected, the process comprising:
   (a) setting desired average thickness limits of the tape to be loaded;
   (b) winding a short piece of length $l_{oi}$ of the magnetic tape from a magnetic tape source and loading it onto the empty hub of the cassette, which empty hub has a radius expressed as $r_o$;
   (c) determining the correlated number of revolutions of the hub expresses as $N_{oi}$;
   (d) measuring the length ($l_{oi}$) of tape wound onto the empty hub;
   (e) loading an additional piece of length $l_{ij}$ of tape on the hub pre-loaded with the tape length $l_{oi}$ and measuring the length $l_{ij}$;
   (f) counting the number of revolutions of the hub correlated to the tape length $l_{ij}$ expressed as $N_i$;
   (g) determining the average thickness of a tape section expressed as $d_{ij}$ using the following equation:

$$d_{ij} = \frac{l_{ij}}{\pi (N_{ij})^2} - \frac{2l_{oi}}{\pi N_{oi} N_{ij}} + \frac{2r_0}{N_{ij}};$$

(h) Repeating the above described procedure stepwise during the loading process for the $l_{oi}$ values $l_{oi} = 1 R_{ij}$, $l_{o2} 2 l_{ij}$, $l_{on} = n \cdot l_{ij}$ and so on and determining the corresponding average thickness values of the tape sections $l_{ij}$ in the distance $l_{oi}$, $l_{o2}$, $l_{on}$ and so on from the beginning of the tape on the empty hub;
   (i) monitoring and displaying the average thickness of the tape sections $l_{ij}$ over the wound length of the tape; and
   (j) ensuring that the average thickness of the measured tape sections fall within the desired average thickness limits, by discontinuing the loading process if one or several $d_{ij}$ - values are out of the desired thickness limits.

3. A method of loading magnetic tape having a length and thickness onto a cassette which has a hub to ensure a minimum roll diameter of the loaded hub, which method comprises the steps of:
   (a) setting a minimum desired roll diameter expressed as $2r_1$;
   (b) winding a magnetic tape from a magnetic tape source and loading a target length $l_s$ of the tape onto the hub of the cassette which hub has the radius expressed as $r_o$;
   (c) measuring the length $l_s$ and counting the correlated number of revolutions of the hub expressed as $N_s$;
   (d) determining the average thickness of the loaded tape with the length $L_s$, by using the equation $$d = \frac{l_s}{\pi (N_s)^2} - \frac{2r_0}{N_s};$$

(e) determining the roll radius of the hub loaded with the tape of the length $l_s$ and the average thickness d expressed as $r_s$ by using the following equation:

$$\pi(r_s)^2 - \pi(r_o)^2 + d l_s;$$

(f) comparing $2r_2$ with the desired minimum roll diameter $2r_1$;
   (g) discontinuing the loading process if $2r_s$ is greater than $2r_1$ or equals $2r_1$;
   (h) determining the length of an additional piece of tape expressed as $\Delta l$ if $2r_s$ is smaller than $2r_0$ by using the formula:

$$\Delta l = \frac{\pi (r_1)^2 - (r_0)^2}{d} - l_s; \text{ and}$$

(i) ensuring the desired minimum roll diameter $2r_1$ by loading additionally the tape length $\Delta l$ to the preloaded target length $l_s$.

* * * * *

UNITED STATES PATENT AND TRADEMARK OFFICE
CERTIFICATE OF CORRECTION

PATENT NO. : 5,136,526
DATED : August 4, 1992
INVENTOR(S) : Reinhold Baur, et. al.

It is certified that error appears in the above-indentified patent and that said Letters Patent is hereby corrected as shown below:

On the Title page, item [73], Assignee: insert --BASF Aktiengesellschaft Ludwigshafen, Fed. Rep. of Germany --.

On the Title page, under item [56], Foreign Patent Documents, insert -- Attorney, Agent, or Firm: Keil & Weinkauf --.

Claim 2, Column 3, line 62, "undetected" should read --detected--.

Signed and Sealed this

Seventeenth Day of August, 1993

Attest:

BRUCE LEHMAN

Attesting Officer

Commissioner of Patents and Trademarks